(12) United States Patent  
Wagner et al.

(10) Patent No.: US 8,066,573 B2
(45) Date of Patent: Nov. 29, 2011

(54) TUBULAR MEMBER HAVING MULTIPLE SIZED SPLINES

(75) Inventors: Nelson Wagner, Gravatai (BR); Bradley S. Jones, Waterville, OH (US); Eric M. Fischer, Maumee, OH (US); Samuel K. Simons, Jonesboro, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 295 days.

(21) Appl. No.: 12/354,060

(22) Filed: Jan. 15, 2009

(65) Prior Publication Data

US 2009/0181779 A1 Jul. 16, 2009

Related U.S. Application Data

(60) Provisional application No. 61/011,099, filed on Jan. 15, 2008.

(51) Int. Cl.
*F16D 3/06* (2006.01)
(52) U.S. Cl. .......................................... 464/16; 464/162
(58) Field of Classification Search .................. 464/16, 464/162, 182; 403/359.1, 359.6
See application file for complete search history.

(56) References Cited

U.S. PATENT DOCUMENTS

| 6,193,612 B1 | 2/2001 | Craig et al. |
| 6,543,266 B1 | 4/2003 | Jaekel |
| 6,754,943 B1 | 6/2004 | Perry et al. |
| 2006/0217210 A1 | 9/2006 | Gibson |

FOREIGN PATENT DOCUMENTS

GB 1 495 565 * 12/1977 ................. 403/359.1

OTHER PUBLICATIONS

Wagner, E. R., "Splines and Axial Motion Devices," Universal Joint and Driveshaft Design Manual, AE-7, Society of Automotive Engineers, Inc., Warrendale, PA, pp. 185-198, TJ1079.S62 1979.*

* cited by examiner

*Primary Examiner* — Gregory Binda
(74) *Attorney, Agent, or Firm* — Marshall & Melhorn LLC

(57) ABSTRACT

A driveshaft assembly includes a tubular slip member having a first spline member having a plurality of splines formed thereon having a first tolerance and a second spline member having a plurality of spline sections. The plurality of spline sections includes a plurality of splines formed thereon having a second tolerance. The second spline member cooperates with the first spline member. A zone is disposed on the second spline member and has a first profile. The zone is disposed adjacent to at least one of the plurality of spline sections of the second spline member, and the first profile defines a clearance relative to the first spline member.

14 Claims, 4 Drawing Sheets

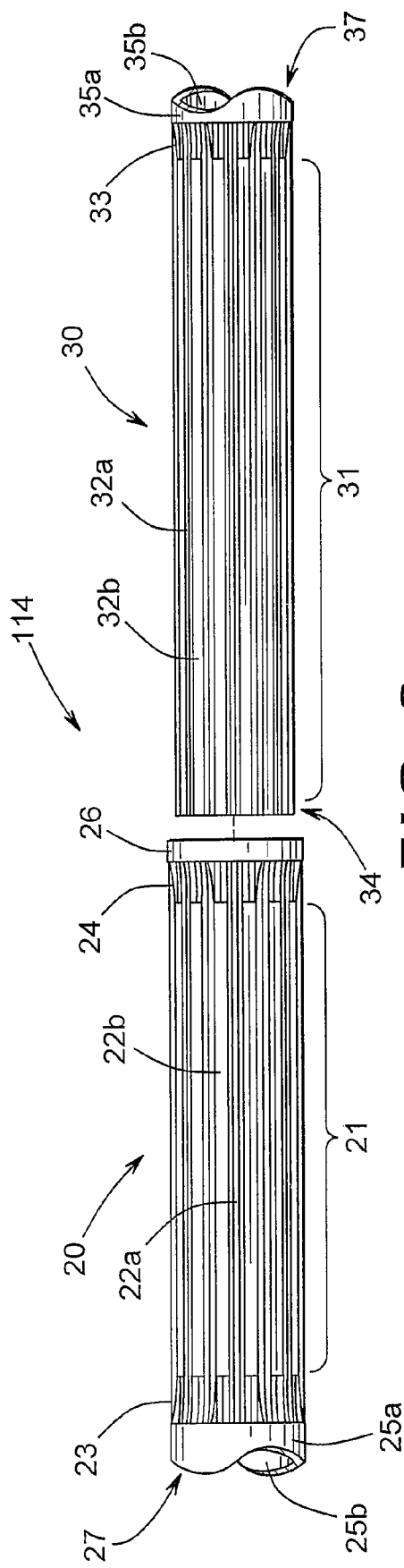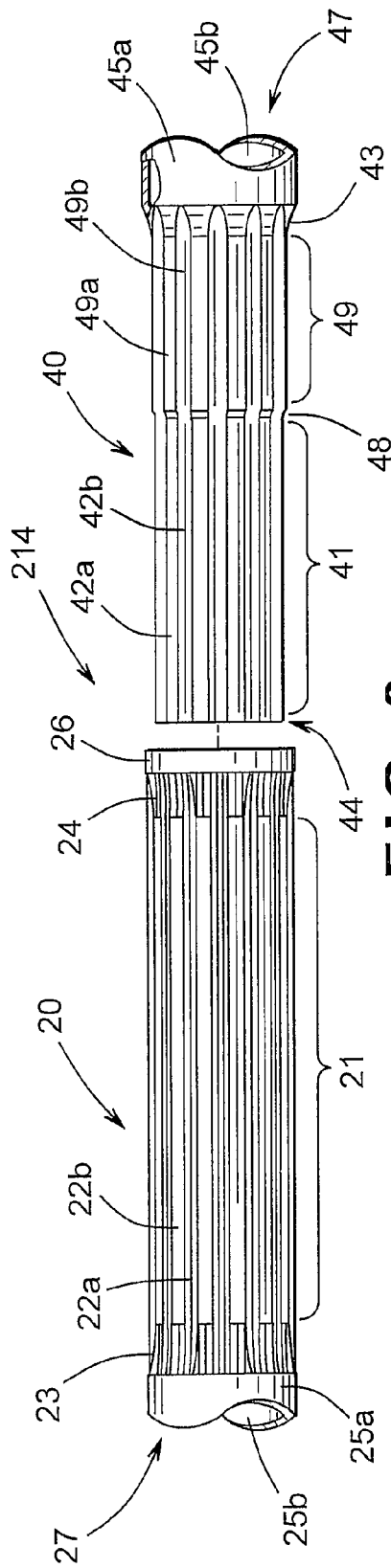
FIG. 2 (PRIOR ART)
FIG. 3 (PRIOR ART)

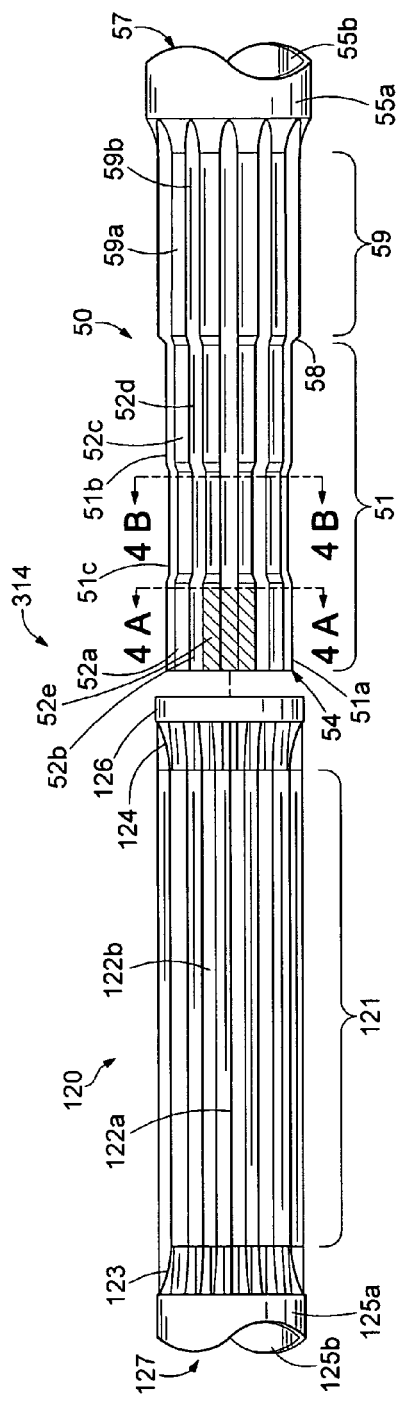
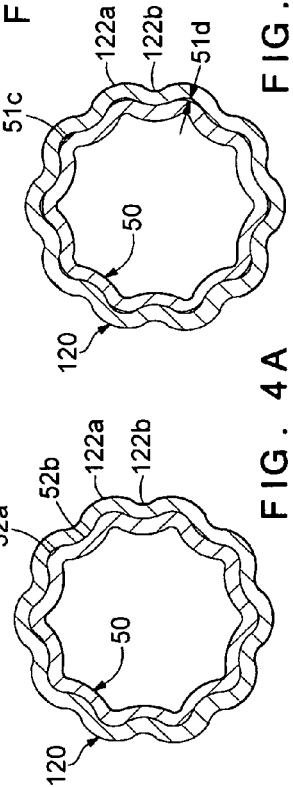
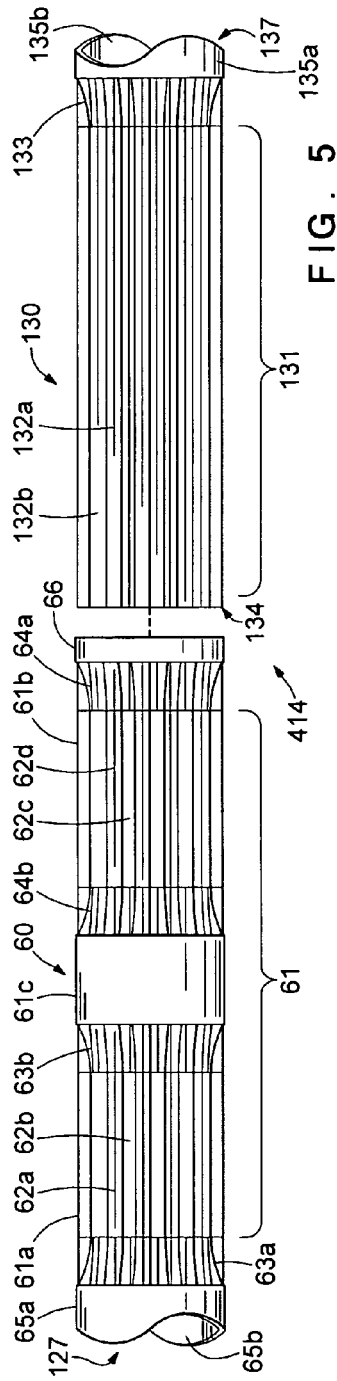
FIG. 4
FIG. 4A
FIG. 4B
FIG. 5

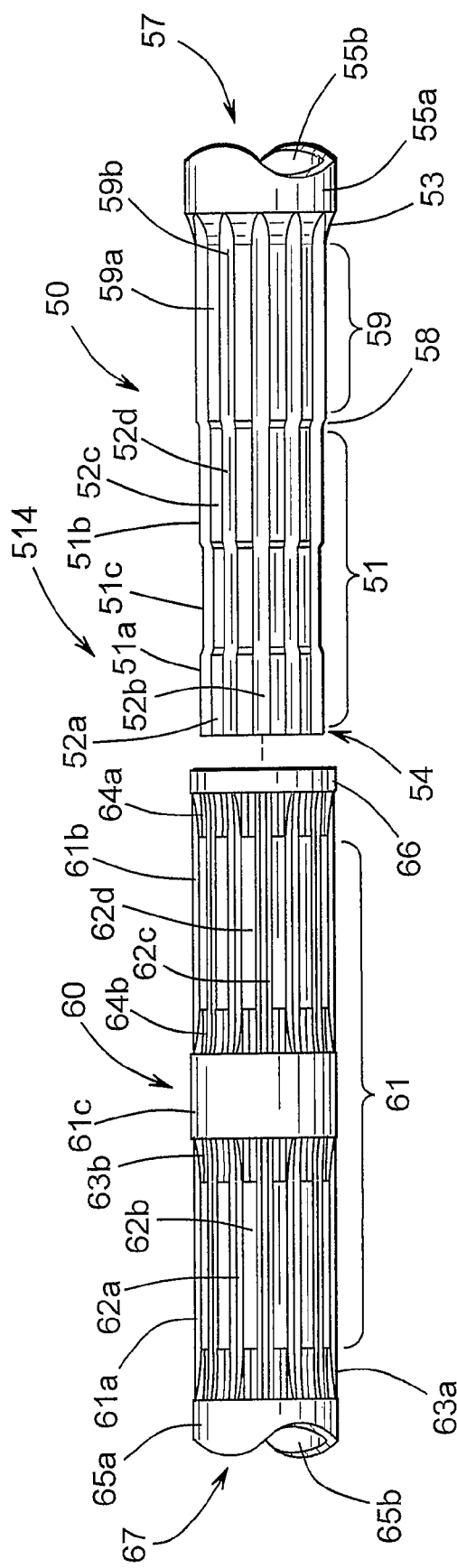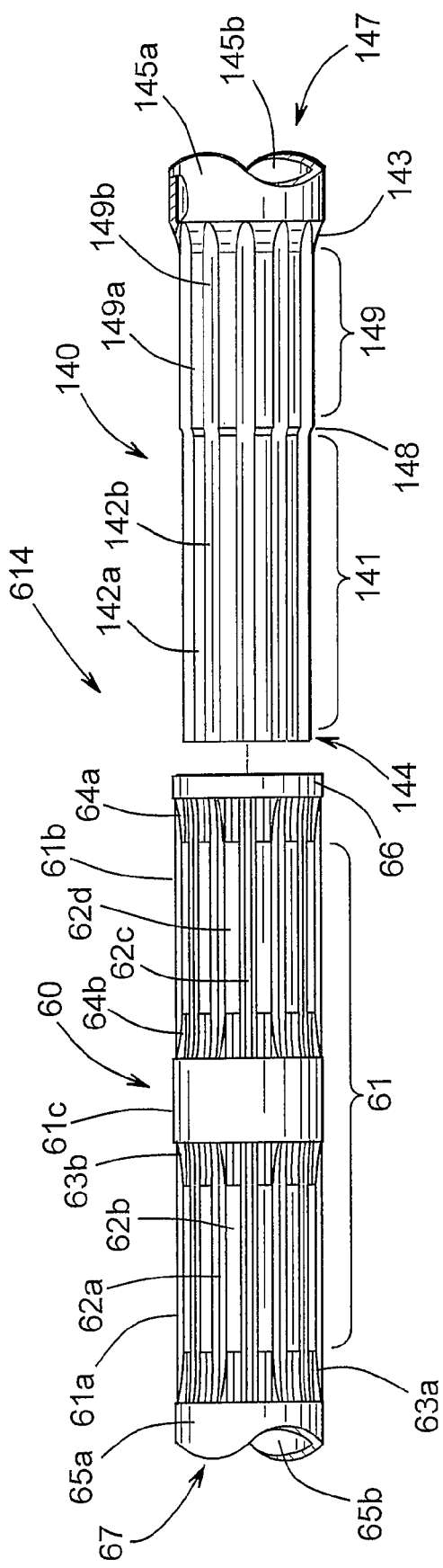
FIG. 6
FIG. 7

TUBULAR MEMBER HAVING MULTIPLE SIZED SPLINES

CROSS-REFERENCE TO RELATED APPLICATIONS

This application claims the benefit of U.S. Provisional Application No. 61/011,099 filed Jan. 15, 2008, the disclosure of which is incorporated herein by reference.

BACKGROUND OF THE INVENTION

This invention relates in general to a tubular member having splines formed thereon. More particularly, this invention relates to a tubular slip member having splines of multiple sizes for use in a vehicular driveshaft assembly. The tubular splines are provided for transmitting rotary motion and accommodating axial length changes, such as in a vehicular drive train system.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must a typical drive train system accommodate a limited amount of angular misalignment between the source of rotational power and the rotatably driven device, but it must also typically accommodate a limited amount of relative axial movement therebetween. For example, in most vehicles, a small amount of relative axial movement frequently occurs between the engine/transmission assembly and the axle assembly when the vehicle is operated. To address this, it is known to provide a slip joint in the driveshaft assembly. A typical slip joint includes first and second members that have respective structures formed thereon that cooperate with one another for concurrent rotational movement, while permitting a limited amount of axial movement to occur therebetween.

One common type of driveshaft slip joint is known as a sliding spline slip joint. A typical sliding spline slip joint includes male and female members having respective pluralities of splines formed thereon. The male member is usually generally cylindrical in shape and has a plurality of outwardly extending splines formed on the outer surface thereof. The male member may be formed integrally with or secured to an end of the driveshaft assembly described above. The female member, on the other hand, is usually generally hollow and cylindrical in shape and has a plurality of inwardly extending splines formed on the inner surface thereof. The female member may be formed integrally with or secured to a yoke that forms a portion of one of the universal joints described above. To assemble the slip joint, the male member is inserted within the female member such that the outwardly extending splines of the male member cooperate with the inwardly extending splines of the female member. As a result, the male and female members are connected together for concurrent rotational movement. However, the outwardly extending splines of the male member can slide relative to the inwardly extending splines of the female member to allow a limited amount of relative axial movement to occur between the engine/transmission assembly and the axle assembly of the drive train system.

The male and female members have traditionally been forged or cast components, and the respective splines have traditionally been cut, rolled, or otherwise formed thereon. An alternative configuration for these spline members is to form the plurality of outwardly and inwardly extending splines directly onto the hollow tubular components of the driveshaft assembly. These tube-formed spline profiles are usually somewhat lower in weight than those of traditional forged or cast construction, but may require a longer mated engagement length. Additionally, the relative spline fits must be tight enough to ensure a stable lateral orientation yet, have sufficient clearance to slip without excessive force. While these tube-formed splines can provide adequate performance, the longer spline-form length often entails an increased processing time in order to provide the necessary fit tolerances for the assembled spline components. Thus, it would be desirable to provide a spline form configuration that can accommodate long spline lengths with reduced process cycle times. It would further be desirable to provide a spline form that provides a tight lateral fit, yet has a lower axial articulation force.

SUMMARY OF THE INVENTION

This invention relates to a driveshaft assembly having a tubular slip member that includes a first spline member having a plurality of splines formed thereon having a first tolerance. The tubular slip member also includes a second spline member having a plurality of spline sections. The plurality of spline sections includes a plurality of splines formed thereon having a second tolerance. The second spline member cooperates with the first spline member. A zone is disposed on the second spline member and has a first profile. The zone is disposed adjacent to at least one of the plurality of spline sections of the second spline member, and the first profile defines a clearance relative to the first spline member.

Various aspects of this invention will become apparent to those skilled in the art from the following detailed description of the preferred embodiments, when read in light of the accompanying drawings.

BRIEF DESCRIPTION OF THE DRAWINGS

FIG. 2 is an exploded, side elevational view of a first prior art tubular slip joint member having male and female components.

FIG. 3 is an exploded, side elevational view of a second prior art tubular slip joint member having male and female components.

FIG. 4 is an exploded, side elevational view of a first embodiment of a tubular slip joint member having male and female components in accordance with this invention.

FIG. 4A is an enlarged, cross-sectional view of the embodiment of a tubular slip joint member having male and female components as shown in FIG. 4, taken along section line 4A-4A in FIG. 4.

FIG. 4B is an enlarged, cross-sectional view of the embodiment of a tubular slip joint member having male and female components as shown in FIG. 4, taken along section line 4B-4B in FIG. 4.

FIG. 5 is an exploded, side elevational view of a second embodiment of a tubular slip joint member having male and female components in accordance with this invention.

FIG. 6 is an exploded, side elevational view of a third embodiment of a tubular slip joint member having male and female components in accordance with this invention.

FIG. 7 is an exploded, side elevational view of a fourth embodiment of a tubular slip joint member having male and female components in accordance with this invention.

DETAILED DESCRIPTION OF THE PREFERRED EMBODIMENTS

Figure 1:
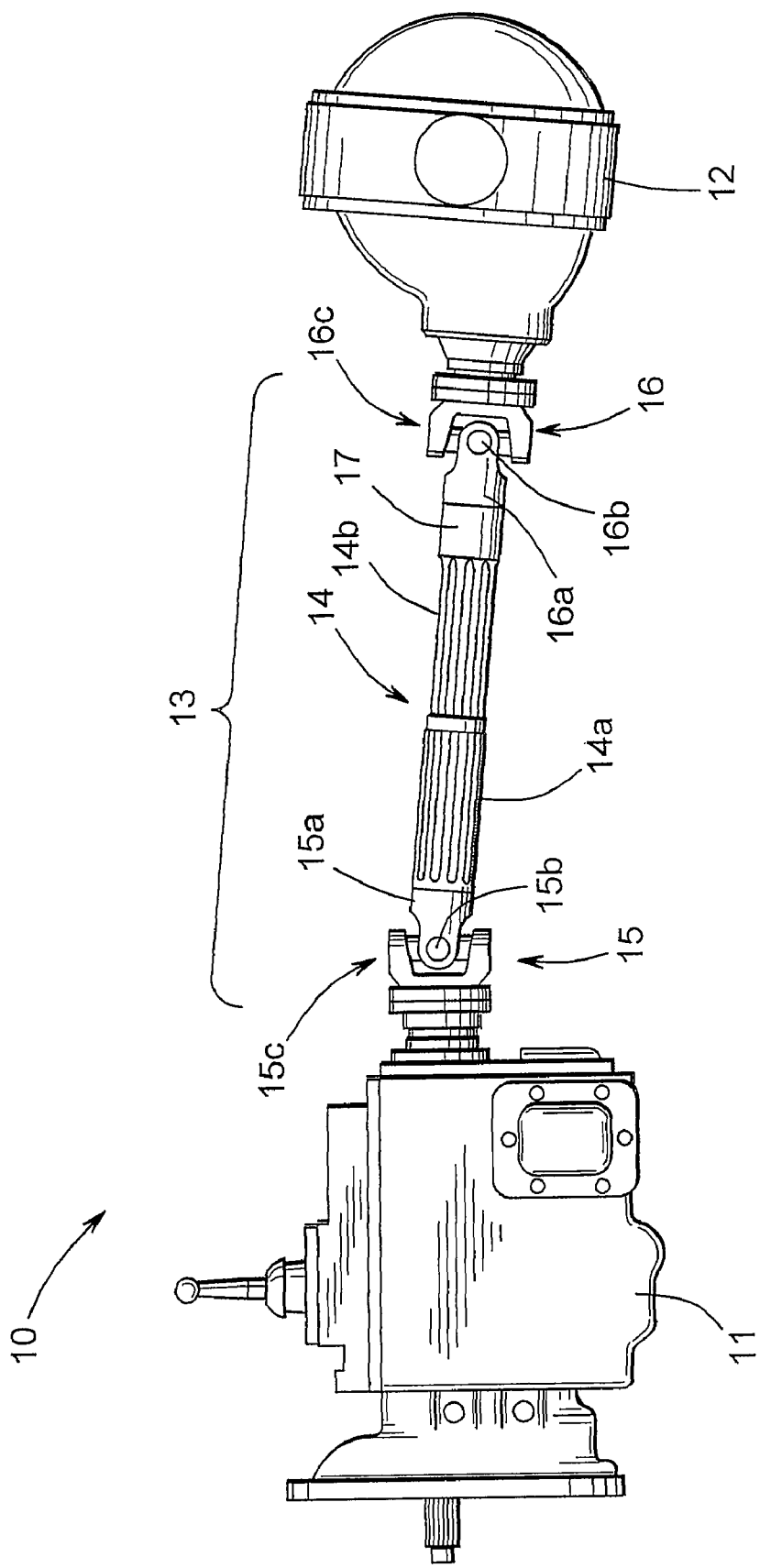
FIG. 1 is a side elevational view of a vehicle drive train system including a driveshaft having a tubular slip joint in accordance with this invention.

Referring now to the drawings, there is illustrated in FIG. 1 a vehicle drive train system, indicated generally at 10, in accordance with this invention. The illustrated vehicle drive train system 10 is, in large measure, conventional in the art and is intended merely to illustrate one environment in which this invention may be used. Thus, the scope of this invention is not intended to be limited for use with the specific structure for the vehicle drive train system 10 illustrated in FIG. 1 or with vehicle drive train systems in general. On the contrary, as will become apparent below, this invention may be used in any desired environment for the purposes described below.

The illustrated vehicle drive train system 10 includes a transmission 11 having an output shaft (not shown), an axle assembly 12 having an input shaft (not shown), and a driveshaft assembly, indicated generally at 13, in accordance with this invention. The vehicle drive train system 10 further includes a forward joint assembly, indicated generally at 15, and a rearward joint assembly, indicated generally at 16. The forward joint assembly 15 includes an output fitting 15c, such as an end yoke, connected to the output shaft of the transmission 12. Similarly, the rearward joint assembly 16 includes an input fitting 16c, such as an end yoke, connected to the input shaft of the axle assembly 12. The driveshaft assembly 13 includes forward and rearward tube yokes 15a and 16a, respectively, and forward and rearward universal joint assemblies 15b and 16b. The universal joint assemblies 15b and 16b are conventional in the art and may be embodied as any desired structures. The forward and rearward joint assemblies 15b and 16b may be provided as other couplings, such as constant velocity joints, elastomeric couplings, multi-link couplings, and the like if desired.

The tube yokes 15a and 16a are connected to a slip joint assembly, indicated generally at 14, in accordance with this invention. The slip joint 14 includes a female-splined, tubular slip member 14a and a male-splined, tubular slip member 14b. FIG. 1 shows the forward tube yoke 15a connected to the female slip member 14a. The rearward tube yoke 16a is shown attached to a tube section 17 that is, in turn, connected to the male slip member 14b, though such is not required. Alternatively, the tube section 17 may be disposed between the forward tube yoke 15a and the female slip member 14a. The tube section 17 may be further disposed between both slip members 14a and 14b and their respective yokes 15a and 16a. The tube section 17 may be a separate component attached to the slip members 14a and 14b by known attachment processes. Alternatively, the tube section 17 may be an integral part of the slip members 14a and 14b. The female and male slip members 14a and 14b, respectively, and their respective mating yokes 15a and 16a may be in an opposite orientation with respect to the input fitting 15c and output fitting 16c, if so desired. The tube section 17 may be utilized as an attachment location for one or more balance weights (not shown) that provide a dynamic balance correction, as is known in the art.

The tube yokes 15a and 16a may be attached to the tubular slip members 14a and 14b, respectively, or the tube section 17, by any appropriate process, such as for example wire welding, friction welding, magnetic pulse welding, magnetic impelled arc bond welding, crimping, adhesive bonding, bolting, riveting, and the like if so desired. Alternatively, the tube yoke 15a and 16a may be formed as an integral part of the tube section 17 or the female and male spline members 14a and 14b, respectively, by any appropriate process, such as for example impact extrusion forming, hydroforming, magnetic pulse forming, rotary swaging, and the like.

Referring now to FIGS. 2 and 3 there are illustrated two prior art, tube-formed slip joint assemblies, indicated generally at 114 and 214, respectively. Where appropriate, the same or similar number are used in indicate components or features having the same or similar functions. The first prior art slip joint assembly 114 shown in FIG. 2 includes a female spline member, indicated generally at 20, and a male spline section, indicated generally at 30. The female spline member 20 includes a plurality of substantially parallel female splines 22a and alternating spaces 22b, formed about a spline section 21, and a sleeve tube end, shown generally at 27. The sleeve tube end 27, which may be a substantially unformed portion of the tube blank or tube pre-form (not shown), has an outer surface 25a and an inner surface 25b. The female splines 22a are formed into the outer surface 25a and extend into the tube interior. The female splines 22a have a generally dimensionally-qualified profile formed onto the inner surface 25b within the tube interior and are disposed around the surface of the spline section 21. The alternating spaces 22b are dimensioned to cooperate with mating male splines and accommodate a sliding engagement therebetween, as will be described in detail below. The spline section 21 is bounded, on either end, by a proximal spline transition zone 23 and a distal spline transition zone 24. The distal spline transition zone 24 may terminate in a seal support 26, but such a seal support structure is not required.

The male spline member 30 shown in FIG. 2 includes a spline section 31 having a plurality of male splines 32a and alternating spaces 32b formed thereabout, and a stub tube end, shown generally at 37. The stub tube end 37, which may be a substantially unformed portion of the tube blank or tube pre-form (not shown), has an outer surface 35a and an inner surface 35b. The stub tube end 37 may provide a clamping location during the spline forming process and may further extend sufficiently in an axial direction to provide a desired overall length for the driveshaft assembly 13. The male alternating spaces 32b are formed into the outer surface 35a and extend into the tube interior. The male splines 32a have a generally dimensionally-qualified profile formed onto the outer surface 35a of the tube blank when the male alternating spaces 32b are formed. The male spline member 30 further includes a proximal spline transition zone 33 and a distal spline transition zone 34. The male distal spline transition zone 34 may provide individual spline profiles where the spline ends at the transition zone 34 may be narrower than the male splines 32a in the male spline section 31. The male distal spline zone 34 may facilitate assembly of the cooperating male spline member 30 into sliding engagement with the female spline member 20. The male distal spline zone 34 may further be made using a deeper plunging of the forming tool in order to counteract the effects of material spring back near the end. Alternatively, the male spline member 30 may omit the male distal spline zone 34, if so desired.

To assemble the first prior art slip joint assembly 114 of FIG. 2, the male splines 32a engage the female alternating spaces 22b in a clearance fit relationship such that a relative sliding movement may be accommodated therebetween. Typically, the female splines 22a engage the male alternating spaces 32b in a clearance fit relationship wherein the clearances between the innermost surface (not shown) of the female splines 22a and the outer surface of the male alternating spaces 32b may be larger than the clearances between the outermost surface of the male spline 32a and the inner surface (not shown) of the female alternating space 22b. The clearance tolerances of both the female slip member 20 and the male slip member 30 may be other than described, however, if the form of the spline fit is not controlled by the spline outer diameter. Alternatively, the spline fits may be controlled by the mating sides of the spline tooth forms. The assembled clearance tolerances, both axial and lateral, impact the dynamic stroke force performance and the dynamic balance capability of the assembled driveshaft. Because of material deflections and inaccuracies occurring during forming, a certain amount of spline helix, or twist, relative to a longitudinal axis, may be taken into account when determining tolerances and processing speeds. Additionally, spline surface waviness exists that may further impact selection of appropriate tolerancing and processing speeds. The conditions of spline helix and spline form waviness become more pronounced as the spline length increases. As such, a slower than desired processing speed is sometimes employed in order to produce the proper spline fit characteristics that achieve the desired driveshaft dynamic operating performance.

The second prior art slip joint assembly 214 illustrated in FIG. 3 includes the female spline member 20 described above and a male spline and collapse member 40. The male spline and collapse member 40 includes a working spline section 41 having a plurality of males splines 42a and male alternating spaces 42b formed thereabout. The working spline section 41 cooperates with the female spline section 21 in the same or similar manner to the engagement described above. The male spline and collapse member 40 further includes a male distal spline transition zone 44 and a stub tube end, shown generally at 47. The male distal spline transition zone 44 functions in the same or similar manner as the male distal spline transition zone 34 described above. The stub tube end 47, which may be a substantially unformed portion of the tube blank or tube pre-form (not shown), has an outer surface 45a and an inner surface 45b. The structure and function of the stub tube end 47 is the same or similar to that described above in conjunction with the stub tube end 37. The male spline and collapse member 40 further includes an energy absorption zone 49, a middle spline transition zone 48, and a male proximal spline transition zone 43.

The energy absorption zone 49 includes a plurality of male crash splines 49a and alternating crash spaces 49b formed thereabout. The male crash splines 49a and the alternating crash spaces 49b are dimensioned to be an interference fit relative to the corresponding female alternating spaces 22b and the corresponding female splines 22a. The relative interference fits may be provided between the male crash splines 49a and the corresponding female alternating spaces 22b or between the alternating crash spaces 49b and the female splines 22a. Alternatively, the interference fits may be between both sets of splines and spaces. The interference fits may also be of an increasing interference over the length of the energy absorption zone 49 from the middle spline transition zone 48 to the male proximal spline transition zone 43. The energy absorption zone 49 is typically not in an engaged position with the female spline member 20 during normal driveshaft slip joint operation. During a severe frontal impact or crash condition, the engine (not shown) and transmission 11 may move rearward toward the axle 12. The rearward movement of the engine and transmission 11 will cause the female spline section 21 to contact the energy absorption zone 49. As the rearward movement continues, the relative interference fit between the engaging splines and spaces causes a radial deformation of the structure which consumes crash energy, thus slowing the rearward movement of the powertrain.

Referring now to FIG. 4, there is illustrated a first embodiment of a slip joint assembly, indicated generally at 314, in accordance with this invention. The slip joint assembly 314 includes a female spline member 120 and a male spline member 50. The female spline member 120 includes a plurality of substantially parallel female splines 122a and alternating spaces 122b, formed about a spline section 121, and a sleeve tube end, shown generally at 127. The sleeve tube end 127, which may be a substantially unformed portion of the tube blank or tube pre-form (not shown), has an outer surface 125a and an inner surface 125b. The female splines 122a are formed into the outer surface 125a and extend into the tube interior. The female splines 122a have a generally dimensionally-qualified profile formed onto the inner surface 125b within the tube interior and are disposed around the surface of the spline section 121. The alternating spaces 122b are dimensioned to cooperate with portions of the male spline member 50 to accommodate a sliding engagement therebetween, as will be described in detail below. The illustrated spline section 121 is bounded, on either end, by a proximal spline transition zone 123 and a distal spline transition zone 124. The proximal spline transition zone 123 eliminates an abrupt start to the spline section 121 which may exhibit forming cracks and/or create a fatigue sensitive notch, thus lowering component life. The distal spline transition zone 124 may terminate in a seal support 126, but such a seal support structure is not required.

The male spline member 50 includes a working spline section 51, a working spline transition zone 58, and an energy absorption zone 59. The male spline member 50 further includes a male proximal spline transition zone 53, a male distal spline transition zone 54, and a stub tube end 57. The male distal spline transition zone 54 may provide individual spline profiles where the spline ends at the transition zone 54 may be narrower than the male splines 52a in a male spline section 51a. The male distal spline zone 54 may facilitate assembly of the cooperating male spline member 50 into sliding engagement with the female spline member 120. The male distal spline zone 54 may further be formed by a deeper plunging of the forming tool in order to counteract the effects of material spring back near the end. Alternatively, the male spline member 50 may omit the male distal spline zone 54, if so desired.

The stub tube end 57, which is a substantially unformed portion of the tube blank or tube pre-form (not shown), has an outer surface 55a and an inner surface 55b. The stub tube end 57 may provide a clamping location to secure the tube blank during the spline forming process. The stub tube end 57 may further extend sufficiently in an axial direction from the various spline sections of the male spline member 50 to provide the proper length requirement of the driveshaft assembly 13. The stub tube end 57 may extend as an integral structure that forms the tube section 17 of FIG. 1. Alternatively, the stub tube end 57 may be provided as an attachment point for the tube section 17 as a separate structure that is attached by various known processes, such as for example wire arc welding, friction welding, magnetic pulse welding, adhesive bonding, riveting, and the like. The working spline section 51 includes a first male spline section 51a, a second male spline section 51b, and a spline relief section 51c disposed therebetween. Though the male spline member 50 is illustrated as including the working spline transition zone 58 and the energy absorption zone 59, such zones are not required. Alternatively, the second male spline section 51b may abut the male proximal spline transition zone 53 thus omitting the energy absorption zone 59. The male proximal spline transition zone 53 eliminates an abrupt start to the working spline section 51 which would exhibit forming cracks or create a fatigue sensitive notch, thus lowering component life.

The first male spline section 51a includes a plurality of substantially parallel first male splines 52a and a plurality of substantially parallel first male alternating spaces 52b formed therein. The first male alternating spaces 52b are formed into the outer surface 55a and extend into the tube interior. The first male splines 52a have a generally dimensionally-qualified profile formed onto the outer surface 55a of the tube blank when the first male alternating spaces 52b are formed. The generally dimensionally-qualified profile of the first male splines 52a may be formed, for example, by opposed rollers (not shown) that include a complementary spline forming profile to create the shape of the spline and impart a level of dimensional accuracy. The second male spline section 51b includes a plurality of substantially parallel second male splines 52c and a plurality of second male alternating spaces 52d formed therein. The second male spline section 51b may be formed in a similar manner as the first male spline section 51a and may further be formed with the same or substantially similar spline form dimensions, dimensional tolerances, and surface characteristics if so desired. Alternatively, the first male spline section 51a may include a different spline dimension relative to the second male spline section 51b, in order to accommodate a coating 52e. The coating 52e may be fluidized nylon material, for example, and may be applied to any appropriate spline surface disclosed herein. Alternately, other coatings and surface treatments may be applied, either in conjunction with or instead of the coating 52e. Such coatings may include plated layers, such as a trivalent or hexavalent chrome, zinc dichromate, electroless nickel, and the like. Surface treatments such as anodizing, surface conversion coatings, or dry film lubricants are also contemplated as applicable treatments to portions of the tube surfaces. Additionally, the spline relief section 51c may be varied in both length and form dimension to effect proper spline engagement and performance characteristics of the slip joint assembly 314, when operating as part of the driveshaft assembly 13 illustrated in FIG. 1.

The spline relief section 51c is formed between the first and second male spline sections 51a and 51b, respectively, and includes a similar spline profile as compared to the adjacent spline sections. The spline relief section 51c exhibits a generally wider tolerance than the first and second male spline sections. When mated with the female spline member 120, the spline relief section 51c further exhibits a clearance 51d between the spline relief features and the corresponding female splines 122a and alternating spaces 122b. As shown in FIGS. 4A and 4B, the clearance 51d relative to the female spline member 120 is greater than a clearance of the first male splines 52a relative to the female spline member 120. The spline relief section 51c, in addition to reducing the contact length of the dimensionally-qualified spline profiles, may support a void that provides a lubricant reservoir between the first and second male spline sections 51a and 51b during operation of the slip joint assembly 314. The spline relief section 51c may be formed during the same processing sequence that forms the first and second male spline sections 51a and 51b, respectively. The spline relief section 51c may also be formed using the same forming tools and processes, such as rollers and other supporting tooling, used to form the dimensionally-qualified spline profiles.

The energy absorption zone 59 includes a plurality of male crash splines 59a and alternating crash spaces 59b formed thereabout. The male crash splines 59a and the alternating crash spaces 59b are dimensioned to be an interference fit relative to the corresponding female alternating spaces 122b and the corresponding female splines 122a. The relative interference fits may be provided between the male crash splines 59a and the corresponding female alternating spaces 122b or between the alternating crash spaces 59b and the female spline 122a. Alternatively, the interference fits may be between both sets of splines and spaces. The interference fits may also be of an increasing interference over the length of the energy absorption zone 59 from the middle spline transition zone 58 to the male proximal spline transition zone 53. The energy absorption zone 59 is not in an engaged position with the female spline member 120 during normal driveshaft slip joint operation. During a severe frontal impact or crash condition, the engine (not shown) and transmission 11 may move rearward toward the axle 12. The rearward movement of the engine and transmission 11 will cause the female spline section 121 to contact the energy absorption zone 59. As the rearward movement continues, the relative interference fit between the engaging splines and spaces causes a radial deformation of the structure which consumes crash energy, thus slowing the rearward movement of the powertrain.

The relative lengths of the first and second male spline sections 51a and 51b, respectively, along with the spline relief section 51c may be varied to provide the necessary slip length, spline tooth stress, and spline engagement requirements of the driveshaft assembly 13, shown in FIG. 1. The lengths of the first and second spline sections 51a and 51b, respectively, along with the spline relief section 51c can also impact the processing speed, the associated forming feed rate, and the lateral and radial spline fit characteristics. The spline engagement is indicative of the relative overlapping engagement between the male spline section or sections and the female spline section or sections. The spline engagement may further be expressed as a ratio of the engaged overall spline length to a spline diameter, such as for example the male spline outer diameter. In general, a higher spline engagement ratio is desirable to minimize lateral deflections associated with the clearance between the male and female spline forms. The slip length is typically the linear dimensional change in length of the slip assembly from a collapsed position to an extended position. In an extended slip position, the spline engagement may be less than in other articulated engagement positions, if so desired. The spline tooth stress represents the load applied per unit area to each spline element in a given spline section or sections and expressed as, for example, pounds per square inch or Pascals.

The male spline member 50 and the female spline member 120 are formed into generally hollow tube blank sections or tube pre-form sections. Though the forming processes are described herein in the context of the slip joint assembly 314, the same processing is generally applicable to any of the other embodiments described below. The male spline member 50 and the female spline member 120 may be formed by any process capable of deforming a localized area into a geometry suitable for generating cooperating spline forms into tubular blanks or tube pre-forms. Such processes, for example, may include roller and mandrel contact forming, such as the cold forming processing of Ernst Grob A G of Switzerland. Alternatively, rack roll forming, magnetic pulse forming, draw forming, hydroforming, rotary swaging, push-pointing, and the like may be employed to impart the spline profiles of the various embodiments described herein. Additionally, though discussed in the context of cold forming, it is understood that elevated temperatures may be employed to aid in forming certain spline geometries, to relieve process-induced stresses, modify material characteristics, and/or speed processing times.

During the spline forming operation of one embodiment of the invention, opposed rollers (not shown) engage the outer surface of the tube blank and displace the tubing material inwardly. A mandrel (not shown) having a corresponding relief profile, in the shape of the general spline form, is inserted in the tube interior. The mandrel, or a portion thereof, may locate against a portion of the tube inner surface 55b. The displaced tube material may be contained between portions of the roller and the mandrel. The rollers engage and traverse across the tube blank surface with a feed rate, typically expressed in units of length per unit of time, such as for example millimeters per minute. The feed rate bears directly on the dimensional tolerance of the first male splines 52a and the first male alternating spaces 52b. The feed rate of the first male spline section 51a may be processed over the desired length at a speed sufficient to produce the proper dimensional tolerances and mated spline fit. As the feed rate increases, the rollers traverse faster across the tube blank surface. The faster traversing speed produces a spline profile having a less controlled dimensional tolerance resulting in the looser fitting slip assembly section. The looser fitting spline section, such as the spline relief section 51c, may be a section disposed between, or adjacent to, a tighter fitting spline such as the energy absorption zone 59. The second male spline section may be processed at the same slower feed rate as the first male spline section 51a, though such a similar feed rate is not required. The working spline transition zone 58 and the energy absorption zone 59 may also be processed at the faster feed rate of the spline relief section 51c, if so desired.

The ability to alter the tooling feed rate relative to various sections of the spline member based on each section's functional requirements provides improved cost and performance attributes for the driveshaft assembly 13. For instance, when using the roller and mandrel forming tools, different roller feed rates and plunge depths may be applied to generate the various spline zones, spline relief zones, energy absorption zones, and transition zones. Since each of these various features of the male and female spline members require different performance characteristics and spline tolerances, advantages with respect to cost and processing time may be realized through use of various feed rates. For example, the first male spline section 51a and the second male spline section 51b may require a higher level of spline precision necessitating a tighter tolerance band relative to other zones or sections of the male spline member 50. The spline relief section 51c may require a larger tolerance, and possibly a smaller tooth form and outer diameter in order to form the larger clearance with the mating female spline section 121. Since the length of the first and second male spline members 51a and 51b, respectively, may be shorter than the entire working spline section 51 the processing time may be reduced by a corresponding amount when compared to the prior art working spline section 41.

The working spline section 51 of the male spline member engages the mating female spline section 121 for concurrent rotation therewith and relative axial movement therebetween. The first and second male splines 52a and 52c engage the female alternating spaces 122b in a clearance relationship having a tightly controlled tolerance. The female splines 122a may engage the first and second male alternating spaces 52b and 52d in a clearance relationship that is slightly larger than the male spline to female space relationship, if so desired. Alternatively, the fit relationships may be substantially the same. The dynamic driveshaft assembly performance characteristics of balance and lateral deflection are achieved based on the contact of the first and second male spline sections 51a and 51b, respectively, with the mating female spline section 121. The lateral deflections of the slip joint assembly 314, which affect driveshaft assembly balance, are controlled by the contact of the relative furthest ends of the first and second male spline sections 51a and 51b, respectively, with the mating female spline section 121. By comparison, the lateral deflections of the slip joint assembly 214 are controlled by the contact of the relative furthest ends of the male spline section 41 with the mating female spline section 21. The processing time for a similar fit and performance characteristic, by virtue of the increased feed rate for the spline relief section 51c, is reduced for the working spline section 51 compared to the prior art working spline section 41.

Referring now to FIG. 5, there is illustrated a second embodiment of a slip joint assembly, indicated generally at 414, in accordance with this invention. The slip joint assembly 414 includes a female spline member, indicated generally at 60, and a male spline member, indicated generally at 130. The male spline member 130 includes a spline section 131 having a plurality of male splines 132a and alternating spaces 132b formed thereabout, and a stub tube end, shown generally at 137. The stub tube end 137, which may be a substantially unformed portion of the tube blank or tube pre-form (not shown), has an outer surface 135a and an inner surface 135b. The stub tube end 137 may provide a clamping location during the spline forming process and may further extend sufficiently in an axial direction to provide the proper length requirement of the driveshaft assembly 13. The stub tube end 137 may extend as an integral structure that forms the tube section 17 of FIG. 1. Alternatively, the stub tube end 137 may be provided as an attachment point for the tube section 17 as a separate structure that is attached by various known processes, such as for example wire arc welding, friction welding, magnetic pulse welding, adhesive bonding, riveting, and the like.

The male alternating spaces 132b are formed into the outer surface 135a and extend into the tube interior. The male splines 132a have a generally dimensionally-qualified profile formed onto the outer surface 135a of the tube blank when the male alternating spaces 132b are formed. The male spline member 130 further includes a proximal spline transition zone 133 and a distal spline transition zone 134. The male distal spline transition zone 134 may provide individual spline profiles where the spline ends at the transition zone 134 may be narrower than the male splines 132a in the male spline section 131. The male distal spline zone 134 may facilitate assembly of the cooperating male spline member 130 into sliding engagement with the female spline member 60. The male distal spline zone 134 may further be made using a deeper plunging of the forming tool in order to counteract the effects of material spring back near the end. Alternatively, the male spline member 130 may omit the male distal spline zone 134, if so desired.

The female spline member 60 includes a working spline section 61, a proximal spline transition zone 63a, a distal spline transition zone 64a, and a stub tube end, shown generally at 67. The proximal spline transition zone 63a is bounded by the working spline section 61 and the stub tube end 67 and further provides an increasingly defined spline form that transitions into the full spline form of the working spline section 61. The proximal spline transition zone 63a further eliminates an abrupt start to the working spline section 61 which would exhibit forming cracks or create a fatigue sensitive notch, thus lowering component life. The distal spline transition zone 64a may terminate in a seal support 66, but such a seal support structure is not required. The working spline section 61 includes a first female spline section 61a and a second female spline section 61b. The first female spline section 61a includes a plurality of substantially parallel female splines 62a and a plurality of substantially parallel alternating spaces 62b. Similarly, the second female spline section 61b includes a plurality of substantially parallel female splines 62c and a plurality of substantially parallel alternating spaces 62d. The first female spline section 61a abuts a first midpoint spline transition zone 63b which transitions into a sleeve clearance relief 61c. The first midpoint spline transition zone 63b includes the same structural forming and life functions associated with the proximal spline transition zone 63a described above.

The sleeve clearance relief 61c is illustrated as a substantially unformed section of the tube blank, though spline teeth and alternating spaces (not shown) having a clearance relative to the mating male splines 132a and male alternating spaces 132b of the male spline member 130. The sleeve clearance relief 61c may be varied in both length and form dimension to effect proper spline engagement and performance characteristics of the slip joint assembly 414, when operating as part of the driveshaft assembly 13 illustrated in FIG. 1. When mated with the male spline member 130, the sleeve clearance relief 61c further exhibits a greater clearance dimension between the spline relief features and the corresponding male splines 132a and alternating spaces 132b. The sleeve clearance relief 61c, in addition to reducing the contact length of the dimensionally-qualified spline profiles, may support a void that provides a lubricant reservoir between the engaged spline sections during operation of the slip joint assembly 414. The sleeve clearance relief 61c may be formed during the same processing sequence that forms the first and second female spline sections 61a and 61b, respectively. The sleeve clearance relief 61c may also be formed using the same forming tools and processes, such as rollers and other supporting tooling, used to form the dimensionally-qualified spline profiles.

Abutting the other end of the sleeve clearance relief 61c is a second midpoint spline transition zone 64b. The second spline transition zone 64b provides a gradual transition of the developing spline forms into the second female spline section 61b. The second spline transition zone 64b provides the same structural forming and life functions as the proximal spline transition zone 63a, described above. The second female spline section 61b may be configured in the same form as, or a similar form to, the first female spline section 61a, though such a configuration is not required. The second female spline section 61b may be formed in a similar manner as the first female spline section 61a and may further be formed with the same or substantially similar spline form dimensions, dimensional tolerances, and surface characteristics if so desired. Alternatively, the first female spline section 61a may include a different spline dimension relative to the second female spline section 61b, in order to accommodate various coatings and surface treatments. A fluidized nylon material is an example of one such spline surface coating that may be applied to any appropriate spline surface disclosed herein.

Referring now to FIG. 6, there is illustrated a third embodiment of a slip joint assembly, indicated generally at 514. The slip joint assembly 514 includes the female spline member 60 and the male spline member 50, the structures of which are both described above. The male and female spline members 50 and 60, respectively, are assembled such that during operation the first female spline section 61a cooperates with the first male spline section 51a for concurrent rotational movement therewith. The second female spline section 61b cooperates with the second male spline section 51b for concurrent rotational movement therewith. The cooperating first and second spline sections of the male and female spline members 50 and 60, respectively, are further engaged in a relative sliding relationship. At least one of the stub tube ends 57 and 67 are sized such that the cooperating first and second spline sections are in an engaged relationship during operation of the driveshaft 13. Alternatively, both stub tube ends 57 and 67 may be sized accordingly to maintain spline engagement during operation. The operation of the energy absorption zone 59 is similar to the description associated with the slip joint assembly 314 as shown in FIG. 4. Though the male spline member 50 is illustrated as including the working spline transition zone 58 and the energy absorption zone 59, such zones are not required. Alternatively, the second male spline section 51b may abut the male proximal spline transition zone 53 thus omitting the energy absorption zone 59.

Referring now to FIG. 7, there is illustrated a fourth embodiment of a slip joint assembly, indicated generally at 614. The slip joint assembly 614 includes the female spline member 60 described above and a male spline and collapse member, shown generally at 140. The male spline and collapse member 140 includes a working spline section 141 having a plurality of males splines 142a and male alternating spaces 142b formed thereabout. The working spline section 141 engages with the first and second female spline sections 61a and 61b, respectively, of the female spline member 60 such that the working spline section 141 is in concurrent rotational contact therewith. The first and second female spline sections 61a and 61b cooperate with the working spline section 141 such that relative sliding movement may be accommodated therebetween.

The male spline and collapse member 140 further includes a male distal spline transition zone, indicated generally at 144, and a stub tube end, indicated generally at 147. The male distal spline transition zone 144 may provide individual spline profiles where the spline ends at the transition zone 144 may be narrower than the male splines 142a in the male spline section 141. The male distal spline zone 144 may facilitate assembly of the cooperating male spline member 140 into sliding engagement with the female spline member 60. The male distal spline zone 144 may further be formed by a deeper plunging of the forming tool in order to counteract the effects of material spring back near the end. Alternatively, the male spline member 140 may omit the male distal spline zone 144, if so desired.

The stub tube end 147, which may be a substantially unformed portion of the tube blank or tube pre-form (not shown), has an outer surface 145a and an inner surface 145b. The stub tube end 147 may provide a clamping location to secure the tube blank during the spline forming process. The stub tube end 147 may further extend sufficiently in an axial direction from the various spline sections of the male spline member 140 to provide the proper length requirement of the driveshaft assembly 13. The stub tube end 147 may extend as an integral structure that forms the tube section 17 of FIG. 1. Alternatively, the stub tube end 147 may be provided as an attachment point for the tube section 17 as a separate structure that is attached by various known processes, such as for example wire arc welding, friction welding, magnetic pulse welding, adhesive bonding, riveting, and the like. The male spline and collapse member 140 further includes an energy absorption zone 149, a middle spline transition zone 148, and a male proximal spline transition zone 143.

The energy absorption zone 149 includes a plurality of male crash splines 149*a* and alternating crash spaces 149*b* formed thereabout. The male crash splines 149*a* and the alternating crash spaces 149*b* are dimensioned to be an interference fit relative to the corresponding female alternating spaces 62*d* and the corresponding female splines 62*c*. The relative interference fits may be provided between the male crash splines 149*a* and the corresponding female alternating spaces 62*c* or between the alternating crash spaces 149*b* and the female splines 62*c*. Alternatively, the interference fits may be between both sets of splines and spaces. The interference fits may also be of an increasing interference over the length of the energy absorption zone 149 from the middle spline transition zone 418 to the male proximal spline transition zone 143. The energy absorption zone 419 is not in an engaged position with the female spline member 60 during normal driveshaft slip joint operation. During a severe frontal impact or crash condition, the engine (not shown) and transmission 11 may move rearward toward the axle 12. The rearward movement of the engine and transmission 11 will cause the female spline section 21 to contact the energy absorption zone 149. As the rearward movement continues, the relative interference fit between the engaging splines and spaces causes a radial deformation of the structure which consumes crash energy, thus slowing the rearward movement of the powertrain.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A slip member comprising:
a first spline member having a plurality of splines formed thereon, the plurality of splines of the first spline member having a first tolerance;
a second spline member having a plurality of spline sections, the plurality of spline sections including a plurality of splines formed thereon, the plurality of splines having a second tolerance, the second spline member cooperating with the first spline member; and
a zone disposed on the second spline member and having a first profile, the first profile having a similar spline profile to the at least one of the plurality of spline sections of the second spline member, wherein the zone is disposed adjacent to at least one of the plurality of spline sections of the second spline member, the first profile defining a clearance relative to the first spline member and mated with the plurality of splines formed on the first spline member.

2. The slip member defined in claim 1 wherein the first spline member includes a plurality of spline sections having a first dimensional characteristic and at least one of the plurality of spline sections of the second spline member has a second dimensional characteristic, and wherein the zone is disposed on at least one of the first and the second spline members and is further disposed adjacent to at least one of the plurality of spline sections of the first and second spline member, the first profile defining a clearance relative to the other of the first and second spline member.

3. The slip member defined in claim 2 wherein the first spline member is a female spline member and the second spline member is a male spline member, the plurality of spline sections of the male spline member cooperate with the plurality of spline sections of the female spline member for relative axial movement and concurrent rotational movement, the first tolerance being substantially similar to the second tolerance.

4. The slip member defined in claim 2 wherein the first spline member is a female spline member and the plurality of female spline sections has a first dimensional characteristic, the second spline member is a male spline member wherein at least one of the plurality of male spline sections has a second dimensional characteristic that is sized to accommodate a coating such that the applied coating exhibits a dimensional characteristic substantially similar to the first dimensional characteristic.

5. The slip member defined in claim 2 wherein the first and second spline members are hollow tubular spline members.

6. The slip member defined in claim 5 wherein the first spline member is a male spline member and wherein the zone is substantially un-deformed from a starting tube geometry.

7. The slip member defined in claim 6 wherein an energy absorption zone is disposed on the male spline member between the working spline zone and a stub tube end, the first spline member is a female spline member that cooperates with the working spline of the male spline member for relative axial movement and concurrent rotational movement, the energy absorption zone adapted to engage the splines of the female spline member in an interference fit relationship when subjected to a rearward movement of a powertrain.

8. The slip member defined in claim 1 wherein the first spline member is a female spline member and the second spline member is a male spline member, the first spline member including a plurality of spline sections having a first dimensional characteristic and at least one of the plurality of spline sections of the second spline member has a second dimensional characteristic, the second tolerance of the plurality of male splines is substantially the same as the first tolerance of the female splines, the second dimensional characteristic of at least one of the male spline sections is sized to accommodate a coating such that the applied coating exhibits a dimensional characteristic that is substantially similar to the first dimensional characteristic and wherein the zone has splines.

9. The slip member defined in claim 8 wherein the male spline member includes an energy absorption zone.

10. The slip member defined in claim 1 wherein the first and second spline members are hollow tubular spline members.

11. The slip member defined in claim 10 wherein the second spline member is a female spline member, and wherein the zone is substantially un-deformed from a starting geometry.

12. The slip member defined in claim 1 wherein the second spline member is a male spline member having a working spline zone, the plurality of spline sections is a first male spline section and a second male spline section, the zone being disposed between the first male spline section and the second male spline section, the first and second male spline sections oriented at opposite ends of the working spline zone.

13. The slip member defined in claim 12 wherein an energy absorption zone is disposed on the male spline member between the working spline zone and a stub tube end, the first spline member is a female spline member that cooperates with the working spline zone of the male spline member for relative axial movement and concurrent rotational movement, the energy absorption zone adapted to engage the splines of the female spline member in an interference fit relationship when subjected to rearward movement of a powertrain.

14. The slip member defined in claim 13 wherein the energy absorption zone includes splines.

* * * * *